Aug. 28, 1951     H. COLEMAN     2,565,756
COMBINATION STABILIZER AND
TORSION BAR SPRING SUPPORT
Filed July 27, 1948     2 Sheets—Sheet 1
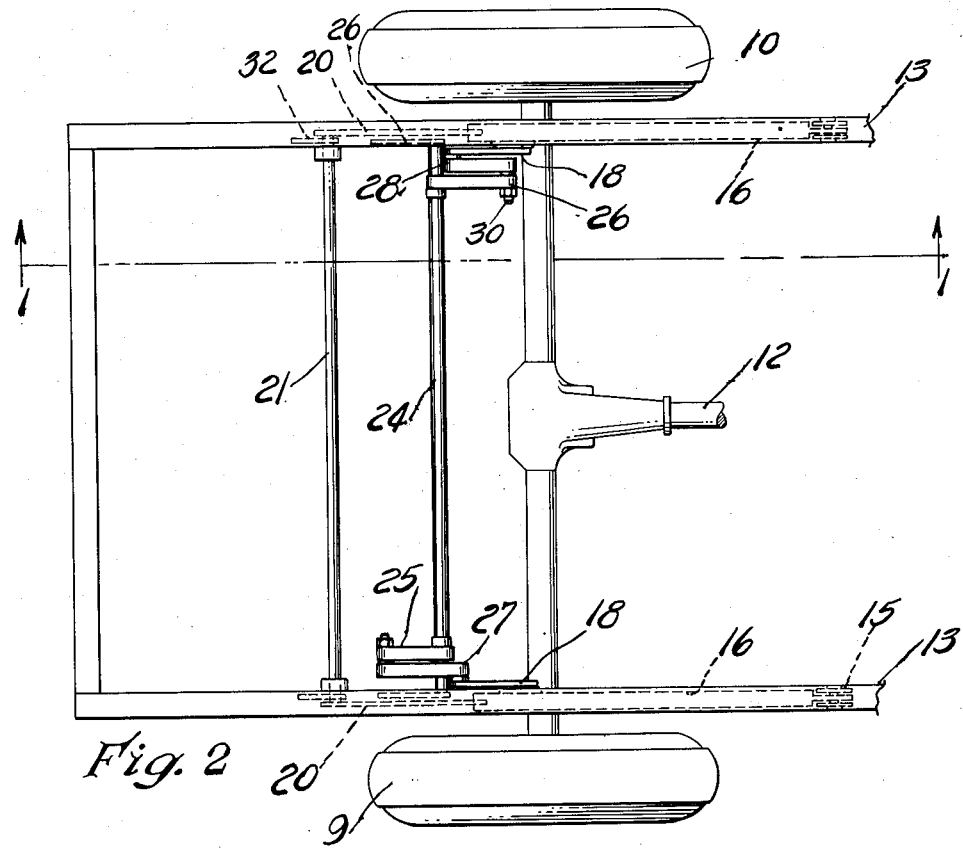
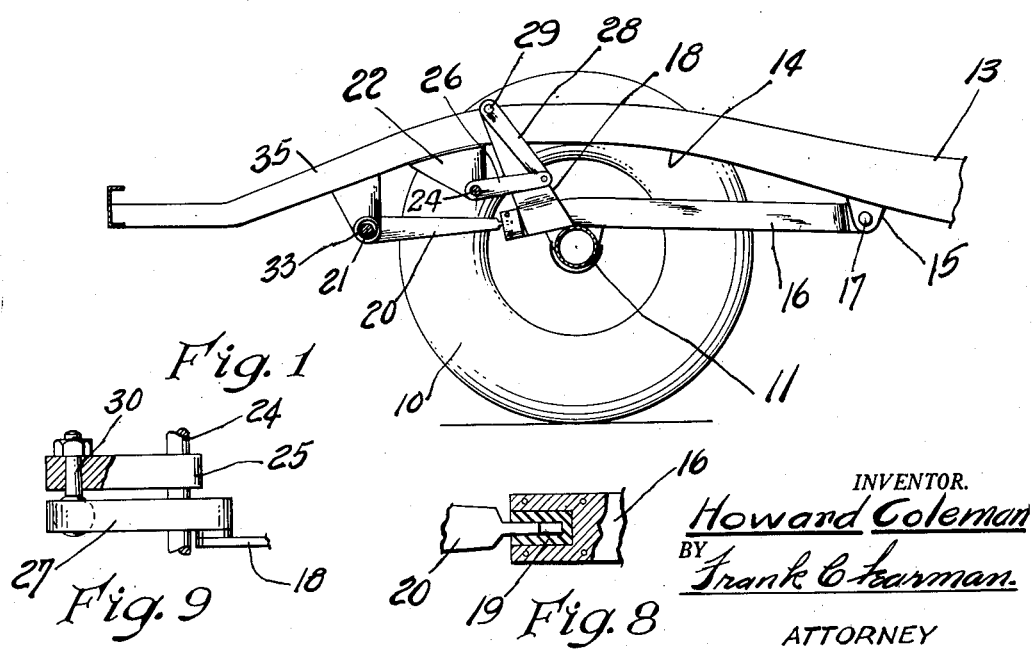
INVENTOR.
Howard Coleman
BY Frank C. Fearman
ATTORNEY Aug. 28, 1951
H. COLEMAN
2,565,756
COMBINATION STABILIZER AND
TORSION BAR SPRING SUPPORT
Filed July 27, 1948
2 Sheets-Sheet 2
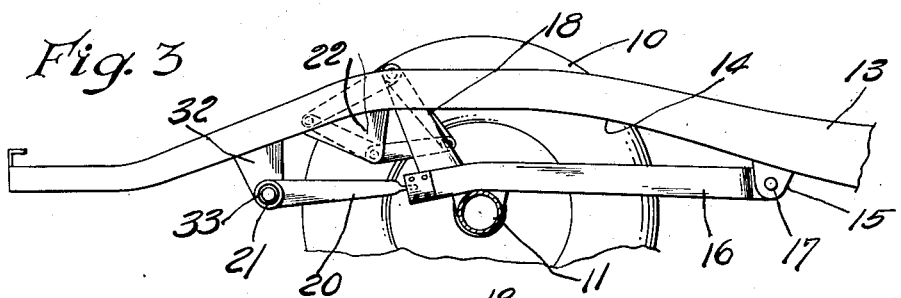
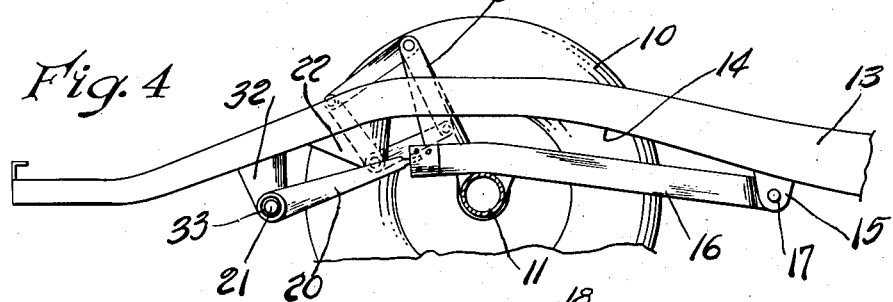
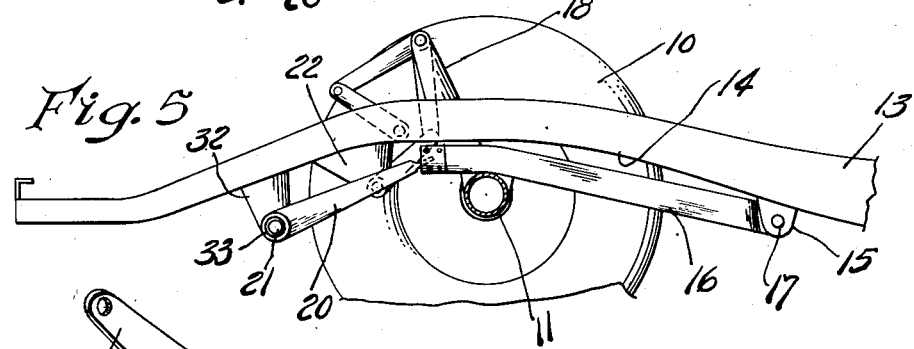
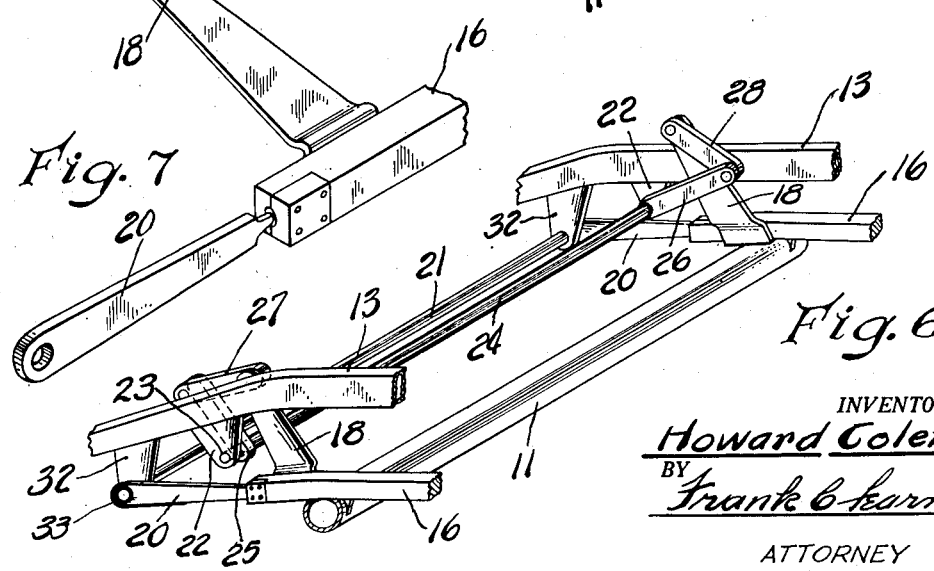
INVENTOR.
Howard Coleman.
BY Frank C. Fearman.
ATTORNEY Patented Aug. 28, 1951

2,565,756

UNITED STATES PATENT OFFICE 2,565,756

COMBINATION STABILIZER AND TORSION BAR SPRING SUPPORT

Howard Coleman, Bay City, Mich.

Application July 27, 1948, Serial No. 40,826

11 Claims. (Cl. 280—104)

This invention relates to a combination stabilizer and torsion bar spring support for automotive vehicles, and more particularly to an efficient mechanism and arrangement by means of which a smooth, even ride is provided.

One of the prime objects of the invention is to design a combination stabilizer and floating torsion bar spring support, by means of which vehicle body sway will be materially minimized, and by means of which road shocks sustained on one wheel or side of the vehicle, are automatically absorbed by the springing equipment of both sides of the vehicle, eliminating back seat sickness and providing a much smoother, even ride.

Another object is to provide a combination stabilizer and torsion bar spring support by means of which shocks on one wheel or side of the vehicle are automatically transmitted, balanced and absorbed on both sides, thereby effecting lower shock stresses and permitting the use of less costly, more uniform steel; this represents a substantial saving because high carbon steel has a much lower percentage of soft spots than does high tension alloys, and inasmuch as these soft spots become apparent only after the bars are finished, it will be obvious that there will be less scrapping of finished bars.

Another object is to provide a full free floating torsion bar assembly which automatically springs both sides of the vehicle.

A further object of the invention is to provide a stabilizer and full floating torsion bar and cantilever arrangement which serves as a spring suspension for the sprung body of the vehicle, and which automatically tends to balance any unbalanced condition, thus equating and stabilizing the spring action caused by one wheel dropping into a hole or striking a raised obstacle while the opposite companion wheel rides true and level.

Still a further object is to provide a combination stabilizer and torsion bar spring arrangement, which in practice provides sufficient flexibility to produce a full floating action and a smooth, even ride.

Still a further object is to provide a very simple, practical, efficient, and substantial combination stabilizer and torsion bar spring arrangement, which can be easily and economically manufactured, assembled and installed.

A further object still is to produce a combined stabilizer and torsion bar spring arrangement which is applicable to any design or type vehicle, which in no manner interferes with the working or operating parts thereof, and which does not interfere with the installation and/or removal of a conventional lifting jack.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is a fragmentary, side-elevational view of the rear wheels and frame of a passenger automobile, showing my combination stabilizer and torsion bar arrangement in position assumed when carrying a normal load.

Fig. 2 is a fragmentary, top, plan view of the mechanism shown in Fig. 1.

Fig. 3 is a view similar to Fig. 1 showing the position of the mechanism when carrying a normal full load.

Fig. 4 is a view similar to Fig. 3 showing the position of the mechanism when both sides of the vehicle are subjected to equalized shock.

Fig. 5 is a similar view showing an instantaneous condition that may arise when one wheel is subjected to sudden shock, while the opposite wheel remains in normal position.

Fig. 6 is a fragmentary, perspective view showing the frame stabilizer and torsion bar arrangement.

Fig. 7 is an enlarged, fragmentary, perspective view of the stabilizer bar arm and cantilever arm extension.

Fig. 8 is a fragmentary, part-sectional, side-elevational view showing the resilient bearing in the ends of the cantilever bars.

Fig. 9 is an enlarged, part-sectional view showing the universal connection of the arms.

Referring now to the drawings in which I have shown the preferred embodiment of my invention. The numerals 9 and 10 indicate the rear ground engaging wheels of an automobile, which are supported and journaled on a rear axle 11 as usual, and these wheels are driven from a drive shaft 12, which leads to and is drivingly connected with an automobile power plant (not shown).

A frame 13 is provided on the vehicle chassis as usual, and is formed with a kick-up 14 at the rear end thereof to provide desired clearance, and shackles 15 are secured to the opposite sides of the frame as shown, and one end of a cantilever bar 16 is hingedly connected to said shackles by means of pins 17, said bars extending rearwardly over and being secured to the axle housing in any desired manner.

Upwardly projecting arms 18 are formed integral with the cantilever bars 16 or can be welded thereto, and resilient bushings 19 are provided in the free ends of the cantilever bars for engagement by the sway bar arms 20 of a sway bar 21, as will be hereinafter more fully described.

Brackets 22 depend from the vehicle frame 13 and bearings 23 are provided therein and in which the ends of the torsion bar 24 are journaled. Torque arms 25 and 26 are rigidly mounted on the ends of the torsion bar 24 as shown, and connecting rods 27 and 28 are pivotally mounted on the cantilever bar arms 18 by means of pins 29, the free ends of each pair of torque arms and connecting rods 25 and 27 and 26 and 28 respectively, being universally connected by the pins 30.

Particular attention is directed to the fact that the torsion bar spans the entire width of the frame, and that there is but one torque arm and one connecting rod only on each side of the frame, these sets of arms being disposed in opposed directions, so that a shock sustained on but one side of the vehicle will be equated and absorbed on both sides; that is, the upward swing of one torque arm activated by shock, automatically effects a reverse or downward swinging movement of the opposing torque arm. Such action causes a slight rise of the bar body on the opposing side which effects an even body rise, and this evening of the body rise is automatically assisted by the stabilizer bar 21.

It will therefore be obvious that when shock results from one wheel striking an obstacle on one side of the road, it will effect a minor rise on both sides of the vehicle instead of a major rise on but one side only, as occurs with the conventional arrangement at present in general use.

The instant design provides a stabilizer and full floating, torsional suspension and arrangement which extends the full width of the chassis and absorbs, in the spring support on both sides of the vehicle, a shock sustained on but one side only.

Consequently, the torsion bar stress is raised approximately but one and one-half times the normal load stress, whereas, a similar shock sustained by a vehicle with separate bars for each side would produce stresses two or more times the normal load stress; therefore, cheaper and more uniform steel can be utilized in the torsion bar, and there is far less scrap of finished bars.

Brackets 32 are provided on the vehicle frame at a point spaced rearwardly from the brackets 22, and bearings 33 are provided therein and in which the stabilizer or sway bar is journaled.

The arms 20 are rigidly secured on the ends of the sway bar 21, the free ends projecting into the resilient bushings 19 provided in the ends of the cantilever bars, thus providing the necessary flexibility, so that the arms and cantilever bars may move with relation to each other.

The fact that the torsion bar can rotate or float provides a very simple and efficient manner of equating and balancing shocks which are then dampened by the sway bar or stabilizer.

The swing movement of the cantilever bars or springs and the associated stabilizing means very materially minimizes any rocking movement. In operation, the falling or rising movement of one side of the vehicle relative to the other develops a torsional resistance in the torsion bar, which automatically balances and transfers resistance to the opposite side of the vehicle and maintains equality of the supporting load on both sides.

To more clearly show the arrangement and combination I have spaced the torque arms and connecting rods from the frame bearings, but it will be understood that these normally would be located close to the bearings to eliminate bending stresses in the torsion bar, etc.

From the foregoing description, it will be clearly obvious that I have perfected a very simple, practical and substantial stabilizer and torsion bar spring arrangement for automotive vehicles in general.

What I claim is:

1. In a vehicle suspension of the character described including a chassis, frame, and springing arrangement, a transversely disposed torsion bar spanning said frame and having opposed torque arms on the opposite ends thereof, said arms being connected to the springing arrangement on the opposite sides of the vehicle, so that a shock sustained on but one side of the vehicle will be equated and absorbed on both sides, a stabilizer bar spanning said frame and spaced from the torsion bar, and arms on said stabilizer bar and yieldably engageable with said springing means.

2. The combination defined in claim 1 in which the springing arrangement includes cantilever bars mounted on the vehicle axle and hingedly connected to the vehicle frame.

3. In a vehicle suspension of the character described including a frame and oppositely disposed wheels, cantilever bars mounted on the vehicle axle and hingedly connected to the frame, a transversely disposed torsion bar spanning said frame, oppositely disposed torque arms mounted on the opposite ends of the torsion bar, connecting rods hingedly connected to the cantilever bars at a point spaced a predetermined distance above the torsion bar, means pivotally connecting the free ends of the torque arms and connecting rod respectively, and a stabilizer bar journaled on the frame in the rear of the torsion bar and connected to said cantilever arms.

4. The arrangement described in claim 3 in which the vertical movement of the vehicle wheel on one side of the vehicle is automatically equated and absorbed in the spring system of both sides of the vehicle.

5. The combination as defined in claim 3 in which the cantilever bars are formed with angularly disposed, upwardly projecting sections to which one end of the connecting rods are pivotally connected.

6. The combination set forth in claim 3 in which the torque arms and connecting rods on opposite sides of the frame are disposed in opposed relation.

7. In a vehicle suspension of the class described including wheels and a frame, cantilever bars mounted on the axle and connected to the side rails of the frame, a substantially vertical extension rigid on each bar adjacent the rear end thereof, a torsion bar journaled on the frame, oppositely disposed torque arms on each end of the torsion bar, connecting rods pivotally connected to said extensions, means for hingedly connecting the free ends of the torque arms and connecting rods respectively, and means associated with the cantilever bars for resisting movement of the torque arms with relation to the frame.

8. The combination defined in claim 7 in which the free ends of the torque arms and the pivotally mounted connecting rods are universally connected.

9. The combination set forth in claim 7 in which means is provided on the frame in the rear of the torsion bar for yieldable connection with said cantilever bars to minimize side sway of said frame.

10. The arrangement set forth in claim 7 in which the resisting means comprises a stabilizer bar journaled on the frame in the rear of the torsion bar, and forwardly projecting arms on said stabilizer bar and having yieldable connection with the ends of the cantilever bars.

11. A vehicle suspension of the character described including a chassis, and frame, and springing arrangement, a transversely disposed torsion bar spanning said frame and having opposed torque arms on the opposite ends thereof, said arms being connected to the springing arrangement on the opposite sides of the vehicle, said springing arrangement comprising cantilever bars mounted on the vehicle axle and hingedly connected to the vehicle frame, an extension on the cantilever bars, and a connecting rod hingedly connecting said torque arms with said extension.

HOWARD COLEMAN.

REFERENCES CITED

The following references are of record in the file of this patent:

UNITED STATES PATENTS

| Number | Name | Date |
| --- | --- | --- |
| 2,083,381 | Hutchison, Jr. | June 8, 1937 |
| 2,226,047 | Borgward | Dec. 24, 1940 |